United States Patent
Genslak et al.

(10) Patent No.: US 7,900,439 B2
(45) Date of Patent: Mar. 8, 2011

(54) EXHAUST SYSTEM MONITORING METHODS AND SYSTEMS

(75) Inventors: Robert J. Genslak, New Baltimore, MI (US); Igor Anilovich, Walled Lake, MI (US); Justin F. Adams, Ypsilanti, MI (US); Jeffry A. Helmick, Oxford, MI (US); Edward Stuteville, Linden, MI (US); Wesley W. Wald, Linden, MI (US); Vidyapriya Srinivasan, South Lyon, MI (US)

(73) Assignee: GM Global Technology Operations, Inc.

( * ) Notice: Subject to any disclaimer, the term of this patent is extended or adjusted under 35 U.S.C. 154(b) by 901 days.

(21) Appl. No.: 11/811,451

(22) Filed: Jun. 8, 2007

(65) Prior Publication Data

US 2008/0302087 A1 Dec. 11, 2008

(51) Int. Cl.
*F01N 3/00* (2006.01)

(52) U.S. Cl. .............. 60/277; 60/274; 60/276; 60/285; 123/688

(58) Field of Classification Search .............. 60/274, 60/276, 277, 285, 286; 123/688
See application file for complete search history.

(56) References Cited

U.S. PATENT DOCUMENTS

| | | | | |
|---|---|---|---|---|
| 4,779,414 A * | 10/1988 | Nagai et al. | | 60/274 |
| 5,386,693 A * | 2/1995 | Orzel | | 60/274 |
| 5,404,718 A * | 4/1995 | Orzel et al. | | 60/274 |
| 5,732,553 A * | 3/1998 | Mitsutani | | 60/276 |
| 5,845,489 A * | 12/1998 | Dohta et al. | | 60/276 |
| 5,851,376 A * | 12/1998 | Nishioka et al. | | 205/784.5 |
| 6,868,666 B2 * | 3/2005 | Frank et al. | | 60/277 |
| 6,874,313 B2 | 4/2005 | Yurgil et al. | | |
| 6,915,203 B2 * | 7/2005 | Maegawa et al. | | 701/114 |
| 7,266,942 B2 * | 9/2007 | Iihoshi et al. | | 60/277 |

* cited by examiner

*Primary Examiner* — Binh Q. Tran

(57) ABSTRACT

A diagnostic system for an exhaust system including a catalyst and a post-catalyst oxygen sensor is provided. The system generally includes a fuel control module that commands fuel to transition from a rich condition to a lean condition and that commands fuel to transition from the lean condition to the rich condition. A first diagnostic module monitors the post-catalyst oxygen sensor during the transition from the rich condition to the lean condition. A second diagnostic module monitors the catalyst during the transition from the lean condition to the rich condition.

14 Claims, 4 Drawing Sheets

EXHAUST SYSTEM MONITORING METHODS AND SYSTEMS

FIELD

The present invention relates to methods and systems for diagnosing a fault of a catalyst and a post-catalyst oxygen sensor in a vehicle.

BACKGROUND

During the combustion process, gasoline is oxidized and hydrogen (H) and carbon (C) combine with air. Various chemical compounds are formed including carbon dioxide ($CO_2$), water ($H_2O$), carbon monoxide (CO), nitrogen oxides ($NO_x$), unburned hydrocarbons (HC), sulfur oxides ($SO_x$), and other compounds.

Automobile exhaust systems include a catalytic converter that reduces exhaust emissions by chemically converting the exhaust gas into carbon dioxide ($CO_2$), nitrogen (N), and water ($H_2O$). Exhaust gas oxygen sensors generate signals indicating the oxygen content of the exhaust gas. An inlet or pre-catalyst oxygen sensor monitors the oxygen level associated with an inlet exhaust stream of the catalytic converter. This inlet $O_2$ sensor is also the primary feedback mechanism that maintains the air-to-fuel (A/F) ratio of the engine at the chemically correct or stoichiometric A/F ratio that is needed to support the catalytic conversion processes. An outlet or post-catalyst oxygen sensor monitors the oxygen level associated with an outlet exhaust stream of the catalytic converter. The post-$O_2$ sensor signal is used for secondary A/F ratio control.

System diagnostics monitor the function of the oxygen sensors and the catalytic converter to ensure proper operation. Traditionally, diagnostics employ separate intrusive tests that evaluate the operation of the sensors and the catalytic converter. During the intrusive tests, the A/F ratio is manipulated and the sensor response is monitored. However, multiple intrusive tests may increase exhaust emissions and/or cause engine instability and reduced driveability that may be noticeable by a vehicle operator. Further, traditional diagnostics are more complex and computationally intense than desired.

SUMMARY

Accordingly, a diagnostic system for an exhaust system including a catalyst and a post-catalyst oxygen sensor is provided. The system generally includes a fuel control module that commands fuel to transition from a rich condition to a lean condition and that commands fuel to transition from the lean condition to the rich condition. A first diagnostic module monitors the post-catalyst oxygen sensor during the transition from the rich condition to the lean condition. A second diagnostic module monitors the catalyst during the transition from the lean condition to the rich condition.

In other features, a method of monitoring an exhaust system that includes a catalyst and a post-catalyst oxygen sensor is provided. The method generally includes: commanding fuel to transition from a rich condition to a lean condition; monitoring the post-catalyst oxygen sensor during the transition from the rich condition to the lean condition; commanding fuel to transition from the lean condition to the rich condition; and monitoring the catalyst during the transition from the lean condition to the rich condition.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
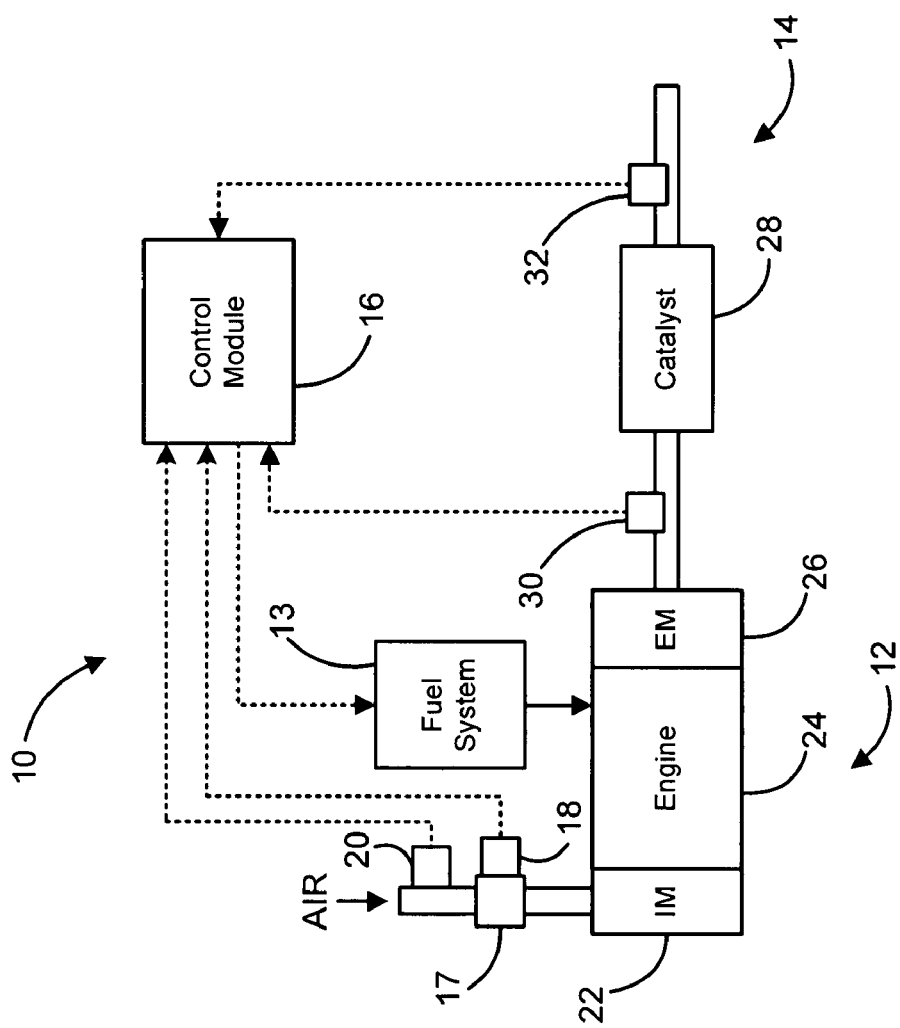
FIG. 1 is a functional block diagram of a vehicle that includes a diagnostic system according to various aspects of the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle 10 includes an engine system 12, a fuel system 13, an exhaust system 14, and a control module 16. The engine system 12 includes a throttle 17, a throttle position sensor (TPS) 18, a mass air flow (MAF) sensor 20, an intake manifold 22 and an engine 24. The exhaust system 14 includes an exhaust manifold 26, a catalyst 28, a pre-catalyst or inlet oxygen sensor 30, hereinafter referred to as pre-O2 sensor 30, and a post-catalyst or outlet oxygen sensor 32, herein after referred to as post-O2 sensor 32.

Air is drawn into the engine 24 through the throttle 17 and the intake manifold 22, and is mixed with fuel from the fuel system 13 inside the engine 24. The throttle position sensor 18 communicates a throttle position signal to the control module 16. The MAF sensor 20 communicates a MAF signal to the control module 16. The air and fuel mixture is combusted within cylinders (not shown) to generate drive torque. The gases produced via combustion exit the engine 24 through the exhaust manifold 26. The exhaust gases are treated within the catalyst 28.

The pre-O2 sensor 30 and the post-O2 sensor 32 generate respective voltage signals that are communicated to the control module 16. The pre-O2 and post-O2 sensor signals indicate the oxygen content of the exhaust entering and exiting the catalyst 28, respectively. Based thereon, the control module 16 communicates with the fuel system 13 to regulate fuel flow to the engine 24. In this manner, the control module 16 regulates the air-to-fuel ratio of the engine 24 to be at or near a desired value (e.g., a stoichiometric value). The control module 16 diagnoses components of the exhaust system 14 based on one or both of the pre-O2 and post-O2 sensor signals. In particular, the control module 16 diagnoses the post-O2 sensor 32 and the catalyst 28 based on the post-O2 sensor signal and/or the pre-O2 sensor signal.

Figure 2:
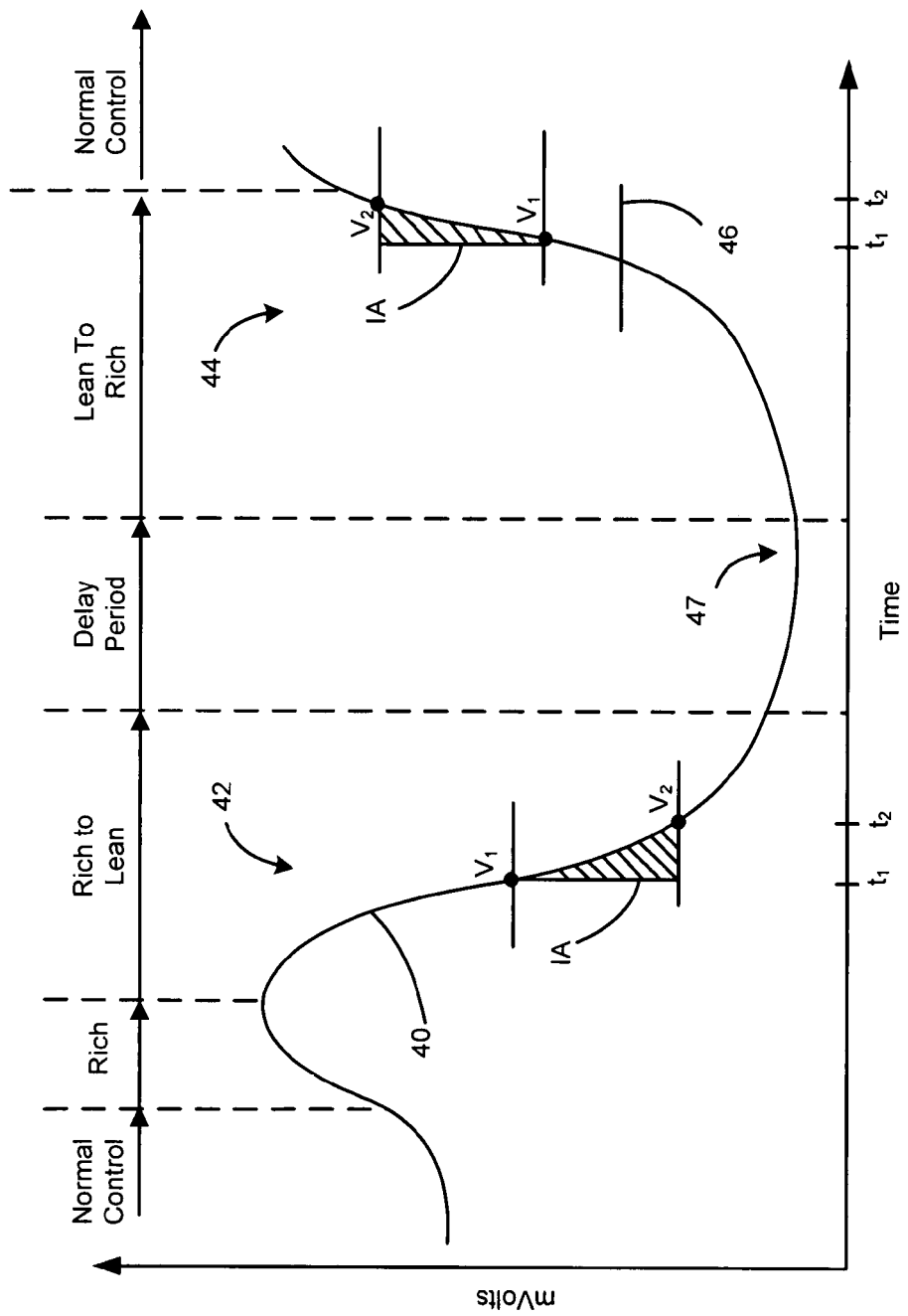
FIG. 2 is a graph illustrating an exemplary signal generated by a post-catalyst oxygen sensor.

Referring now to FIG. 2, the post-O2 sensor 32 (FIG. 1) is typically a narrow range "switching" sensor. The voltage output signal is generated by the sensor 32 (FIG. 1) based on the oxygen content of the exhaust gases passing thereby. High amounts of oxygen content indicate that the air-to-fuel ratio is lean or less than the desired value. In contrast, low amounts of oxygen content indicate that the air-to-fuel ratio is rich or greater than the desired value. FIG. 2 illustrates an exemplary oxygen sensor signal 40 that is generated by the post-O2 sensor 32 (FIG. 1) while the control module 16 (FIG. 1) is diagnosing the components of the exhaust system 14 (FIG. 1).

In general, an oxygen sensor signal generated by a healthy or operating sensor varies based on the oxygen content of the exhaust gas. A common characteristic of a malfunctioning oxygen sensor is a lazy or sluggish response. For example, with a malfunctioning oxygen sensor, an increased amount of time is required for the signal to transition from high to low (e.g., rich to lean) and/or low to high (e.g., lean to rich). Therefore, the control module 16 (FIG. 1) diagnoses the oxygen sensor during a first rich to lean transition as shown at 42, during a second lean to rich transition as shown at 44, or during both the first rich to lean transition 42 and the second lean to rich transition 44.

The oxygen sensor signal 40 can also be used to diagnose the catalyst 28. For example, the post-O2 sensor signal 40 and/or the pre-O2 sensor signal (not shown) can be monitored during the second lean to rich transition as shown at 46 to estimate an oxygen storage capacity of the catalyst 28. The control module 16 (FIG. 1) performs the estimation after a fuel cutoff period as shown at 47, so that the catalyst 28 can be saturated with oxygen.

Figure 3:
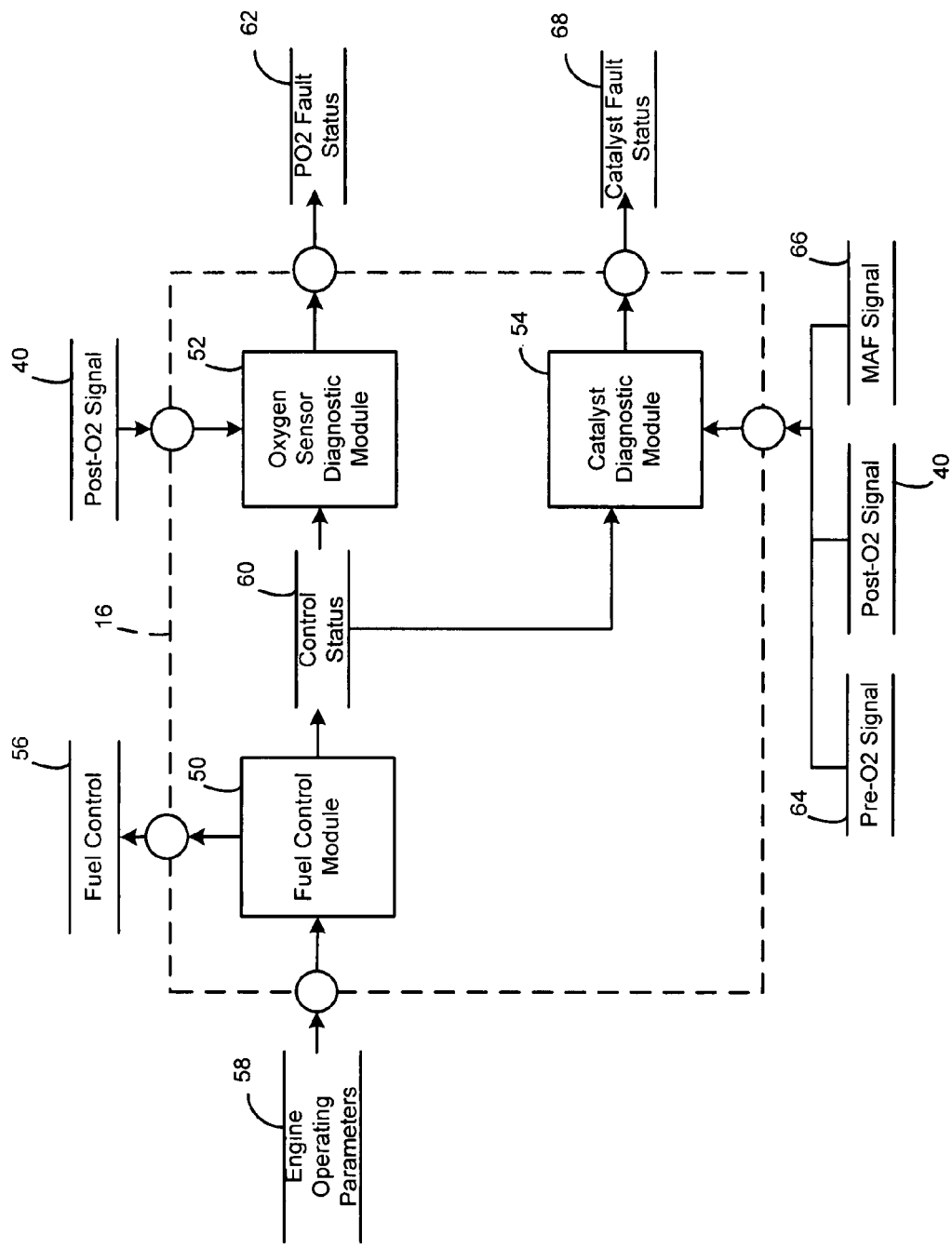
FIG. 3 is a dataflow diagram illustrating an exemplary diagnostic system according to various aspects of the present disclosure.

Referring now to FIG. 3, a dataflow diagram illustrates various embodiments of the diagnostic system that may be embedded within the control module 16. Various embodiments of diagnostic systems according to the present disclosure may include any number of sub-modules embedded within the control module 16. As can be appreciated, the sub-modules shown may be combined and/or further partitioned to similarly diagnose components of the exhaust system 14 (FIG. 1). Inputs to the system may be sensed from the vehicle 10 (FIG. 1), received from other control modules (not shown) within the vehicle 10 (FIG. 1), and/or determined by other sub-modules (not shown) within the control module 16. In various embodiments, the control module 16 of FIG. 3 includes a fuel control module 50, an oxygen sensor diagnostic module 52, and a catalyst diagnostic module 54.

The fuel control module 50 regulates the air-to-fuel ratio of the engine 24 (FIG. 1) by generating a fuel control signal 56 to the fuel system 13 (FIG. 1). The fuel control module 50 controls the air-to-fuel ratio such that the diagnosing of both the post-O2 sensor 32 (FIG. 1) and the catalyst 28 (FIG. 1) can be performed during a single intrusive operation. By combining the fuel control for diagnosing both the post-O2 sensor 32 (FIG. 1) and the catalyst 28 (FIG. 1), the number of intrusive operations as well as the amount of time spent in the intrusive operation is reduced thus, improving emissions as well as fuel economy.

In various embodiments, the fuel control module 50 determines if a non-intrusive operation is desired or if an intrusive operation can be performed based on, for example, engine operating parameters 58. For example, a non-intrusive operation is desired when the driver performs a deceleration fuel cut-off maneuver, such as coasting down a hill. During the deceleration fuel cut-off (DFCO) mode, the fuel control module 50 commands the fuel control signal 56 such the oxygen sensor signal 40 (FIG. 2) transitions from rich to lean. This allows the post-O2 sensor 32 (FIG. 1) to be diagnosed.

The fuel control module 50 then, if desirable, commands the fuel control signal 56 such that the lean condition is maintained for a time period sufficient to allow the catalyst 28 (FIG. 1) to become saturated with oxygen. Thereafter, the fuel control module 50 commands the fuel control signal 56 such that the air-to-fuel ratio and thus, the oxygen sensor signal 40 (FIG. 1) transitions from lean to rich. This allows the catalyst 28 (FIG. 1) and the post-O2 sensor 32 (FIG. 1) to be diagnosed. The fuel control module 50 generates a control status 60 indicating the state of operation of the fuel control. In various embodiments, the control status 60 is an enumeration with values indicating at least one of 'rich to lean transition' and 'lean to rich transition.'

The oxygen sensor diagnostic module 52 receives as input the post-O2 sensor signal 40 and the control status 60. The oxygen sensor diagnostic module 52 monitors the performance of the post-O2 sensor 32 (FIG. 1) by calculating an integrated area (IA) above or below the sensor's voltage signal during the transition from rich to lean and/or the transition from lean to rich. As the signal transition speed decreases, the IA increases. The IA is compared to a threshold IA ($IA_{THR}$) to determine whether the signal has so deteriorated that the post-O2 sensor 32 (FIG. 1) should be serviced or replaced. Based on the comparison, the oxygen sensor diagnostic module 52 sets a post-O2 (PO2) fault status 62. For example, if the IA is greater than the $IA_{THR}$, the PO2 fault status 62 is set to 'TRUE' or 'Test Fail.' If the IA is less than or equal to the $IA_{THR}$, the fault status is set to 'FALSE' or 'Test Pass.' In various embodiments, a separate PO2 fault status 62 can be implemented for the rich to lean transition and the lean to rich transition.

With reference to FIGS. 2 and 3, the IA is calculated between first and second voltages $V_1$ and $V_2$, respectively. $V_1$ and $V_2$ are selected based on preliminary data analysis of the lean (e.g., during DFCO) and rich transitions for a plurality of combinations of the post-catalyst oxygen sensor and catalyst states. For example, the preliminary data includes data collected using a good (i.e., appropriately functioning) post-catalyst oxygen sensor combined with a good catalyst, a good post-catalyst oxygen sensor combined with a bad catalyst (i.e., not appropriately functioning), a bad post-catalyst oxygen sensor combined with a bad catalyst, and a bad post-catalyst oxygen sensor combined with a good catalyst. The voltages that are the most sensitive to failure of the post-catalyst oxygen sensor and at the same time is the least sensitive to the catalyst state are selected. The voltages are selected separately for the first rich to lean transition 42 and for the second lean to rich transition 44. An exemplary method and system for computing an IA is disclosed in U.S. patent application Ser. No. 11/671,916 and incorporated herein by reference.

Referring back to FIG. 3, the catalyst diagnostic module 54 receives as input the post-O2 sensor signal 40, the pre-O2 sensor signal 64, the MAF signal 66, and the control status 60. When the control status 60 indicates a lean to rich transition, the catalyst diagnostic module 54 computes an oxygen storage capacity (OSC) of the catalyst 28 (FIG. 1) over a target time period. The OSC is computed based on the MAF signal 66 and the oxygen sensor signals 40 and 64. An exemplary method and system for computing an OSC of the catalyst is disclosed in U.S. Pat. No. 6,874,313 and incorporated herein by reference.

The catalyst diagnostic module 54 compares the OSC to a threshold OSC ($OSC_{THR}$) to diagnose a conversion capability of the catalyst 28 (FIG. 1). Based on the conversion capability, the catalyst diagnostic module 54 sets a catalyst fault status 68. For example, if the computed OSC is greater than the $OSC_{THR}$, the catalyst fault status 68 is set to 'FALSE' or 'Test Pass.' If the computed OSC is less than or equal to the $OSC_{THR}$, the catalyst fault status 68 is set to 'TRUE' or 'Test Fail.'

Figure 4:
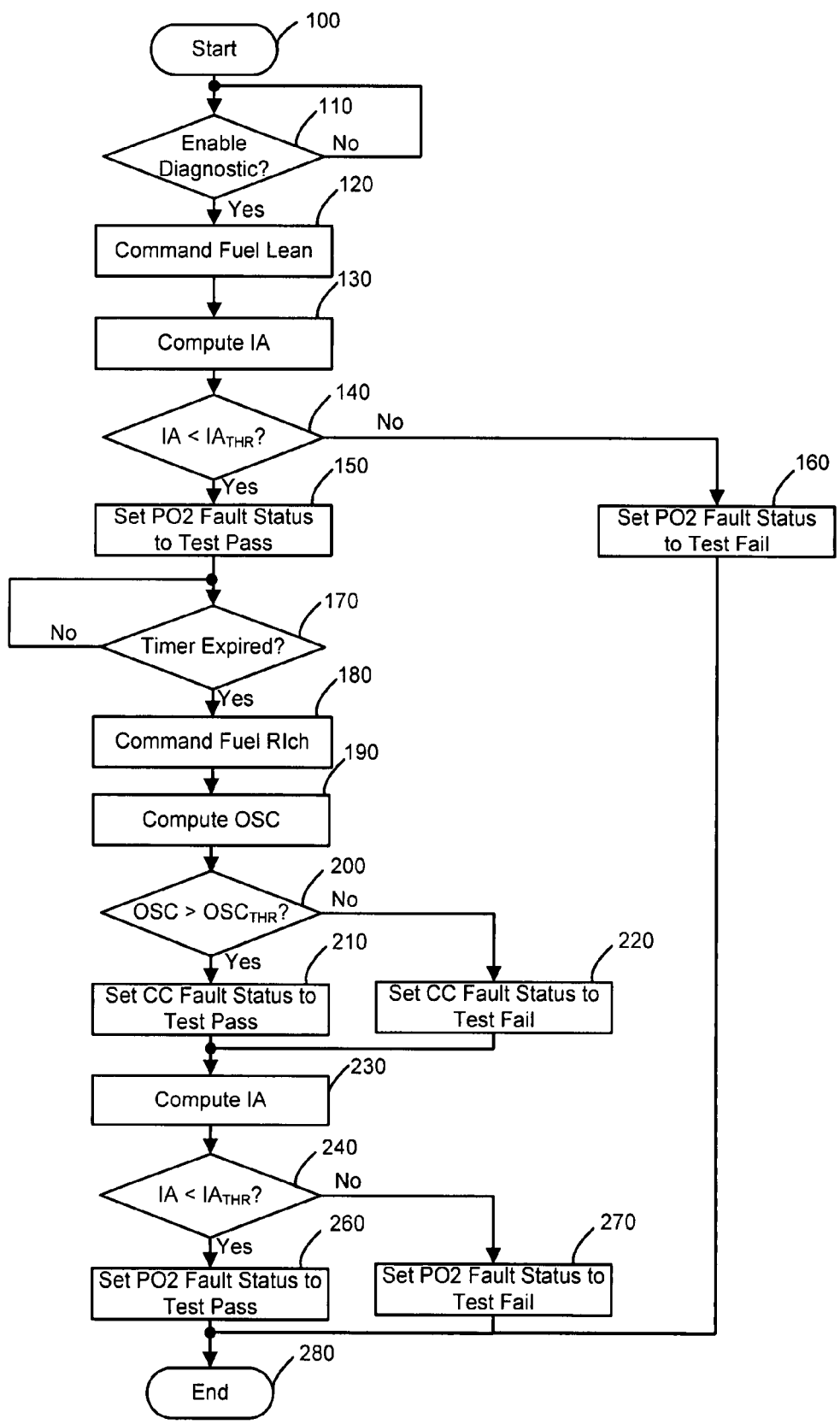
FIG. 4 is a flowchart illustrating an exemplary diagnostic method according to various aspects of the present disclosure.

Referring now to FIG. 4, a flowchart illustrates a diagnostic method that can be performed by the diagnostic system of FIG. 3 in accordance with various aspects of the present disclosure. As can be appreciated, the order of execution of the steps of the diagnostic method can vary without altering the spirit of the method. The method may be performed periodically during vehicle operation, scheduled to run based on certain events (e.g., once per key cycle), or based on an initiated command.

The method may begin at 100. At 110, it is determined whether the exhaust system diagnostic can be enabled. For example, if a non-intrusive fuel transition is to occur (e.g., DFCO), the diagnostic can be enabled. It is appreciated, however, that the diagnostic can be enabled any time deemed appropriate and can be enabled using an intrusive fuel transition. Once the diagnostic can be enabled at 110, fuel is commanded lean via the fuel control signal 56 at 120 and the IA is computed at 130 and evaluated at 140. If the IA is greater than a predetermined IA threshold at 140, the PO2 fault status 62 is set to 'Test Pass' at 150. Otherwise, if the IA is less than or equal to the predetermined IA threshold at 140, the PO2 fault status 62 is set to 'Test Fail' at 160 and the method may end at 280.

Once the post-O2 sensor 32 (FIG. 1) has passed the diagnosing at 150, a time period is evaluated at 170. If a predetermined time period for operating in the lean condition has elapsed at 170, fuel is commanded rich via the fuel control signal 56 at 180 and the OSC is computed at 190 and evaluated at 200. If the OSC is greater than a predetermined OSC threshold at 200, the catalyst fault status 68 is set to 'Test Pass' at 210. Otherwise, if the OSC is less than or equal to the predetermined OSC threshold at 200, the catalyst fault status 68 is set to 'Test Fail' at 220.

Once the catalyst 28 (FIG. 1) is diagnosed at 210 or 220, the post-O2 sensor 32 (FIG. 1) can optionally be evaluated during the lean to rich transition. The IA is computed 230 and evaluated at 240. If the IA is less than a predetermined IA threshold at 240, the PO2 fault status 62 is set to 'Test Pass' at 260. Otherwise, if the IA is greater than a predetermined IA threshold at 240, the PO2 fault status 62 is set to 'Test Fail' at 270. Thereafter, the method may end at 280.

As can be appreciated, once the fault status 62 or 68 for either the catalyst 28 (FIG. 1) or the post-O2 sensor 32 (FIG. 1) is set to 'Test Fail,' additional steps can be performed to notify other systems and users of the failure. In various embodiments, a diagnostic code is set based on the fault status 62 or 68. The diagnostic code can be retrieved by a service tool or transmitted to a remote location via a telematics system. In various other embodiments, an indicator lamp is illuminated based on the fault status 62 or 68. In various other embodiments, an audio warning signal is generated based on the fault status 62 or 68.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A diagnostic system for an exhaust system including a catalyst and a post-catalyst oxygen sensor, comprising:
    a first diagnostic module that monitors the post-catalyst oxygen sensor during a first period, that estimates a total integrated area based on a signal from the post-catalyst oxygen sensor, that compares the total integrated area to a threshold integrated area, and that determines a pass/fail status of the post-catalyst oxygen sensor based on the comparison,
    wherein the first diagnostic module generates a pass status signal when the total integrated area is less than the threshold integrated area and generates a fail status signal when the total integrated area is greater than the threshold integrated area; and
    a second diagnostic module that monitors the catalyst during a second period, and that determines a pass/fail status of the catalyst based on the monitoring during the second period, wherein the first period includes the second period, and wherein the second period starts after the first period starts.

2. The diagnostic system of claim 1 wherein the second diagnostic module determines the pass/fail status of the catalyst by estimating an oxygen storage capacity of the catalyst.

3. The diagnostic system of claim 2 wherein the second diagnostic module compares the oxygen storage capacity to a threshold oxygen storage capacity and generates a pass status signal when the oxygen storage capacity is greater than the threshold oxygen storage capacity.

4. The diagnostic system of claim 3 wherein the second diagnostic module generates a fail status signal when the oxygen storage capacity is less than the threshold oxygen storage capacity.

5. A method of monitoring an exhaust system that includes a catalyst and a post-catalyst oxygen sensor, comprising:
    monitoring the post-catalyst oxygen sensor during a first period;
    estimating a total integrated area based on a signal from the post-catalyst oxygen sensor;
    comparing the total integrated area to a threshold integrated area;
    determining a pass/fail status of the post-catalyst oxygen sensor based on the comparison;
    generating a pass status signal when the total integrated area is less than the threshold integrated area;
    generating a fail status signal when the total integrated area is greater than the threshold integrated area;
    monitoring the catalyst during a second period, wherein the first period includes the second period, and wherein the second period starts after the first period starts; and
    determining a pass/fail status of the catalyst based on the monitoring during the second period.

6. The method of claim 5 wherein the determining the pass/fail status of the catalyst comprises determining the pass/fail status of the catalyst by estimating an oxygen storage capacity of the catalyst.

7. The method of claim 6 further comprising:
    comparing the oxygen storage capacity to a threshold oxygen storage capacity; and
    generating a pass status signal when the oxygen storage capacity is greater than the threshold oxygen storage capacity.

8. The method of claim 7 further comprising generating a fail status signal when the oxygen storage capacity is less than the threshold oxygen storage capacity.

9. The diagnostic system of claim 1, wherein the first period starts when a first rich air/fuel (A/F) ratio is commanded and ends when transitions from the first rich A/F ratio to a lean A/F ratio and from the lean A/F ratio to a second rich A/F ratio are completed.

10. The diagnostic system of claim 9, wherein the second period starts when the first rich A/F ratio is achieved and ends when the transitions are completed.

11. The diagnostic system of claim 10, wherein the commanding of the first rich A/F ratio and the transitions are forced during an active diagnostic operation.

12. The method of claim 5, wherein the first period starts when a first rich air/fuel (A/F) ratio is commanded and ends when transitions from the first rich A/F ratio to a lean A/F ratio and from the lean A/F ratio to a second rich A/F ratio are completed.

13. The method of claim 12, wherein the second period starts when the first rich A/F ratio is achieved and ends when the transitions are completed.

14. The method of claim 13, wherein the commanding of the first rich A/F ratio and the transitions are forced during an active diagnostic operation.

* * * * *